(12) United States Patent
Hetrick et al.

(10) Patent No.: US 7,779,728 B2
(45) Date of Patent: Aug. 24, 2010

(54) ORIENTING ARRANGEMENT FOR MIRROR OR LIGHT SOURCE

(75) Inventors: Joel A. Hetrick, Ann Arbor, MI (US); Gregory F. Ervin, Garden City, MI (US)

(73) Assignee: FlexSys, Inc., Ann Arbor, MI (US)

( * ) Notice: Subject to any disclaimer, the term of this patent is extended or adjusted under 35 U.S.C. 154(b) by 671 days.

(21) Appl. No.: 11/659,251

(22) PCT Filed: Aug. 2, 2005

(86) PCT No.: PCT/US2005/027449

§ 371 (c)(1), (2), (4) Date: Feb. 2, 2007

(87) PCT Pub. No.: WO2006/017520

PCT Pub. Date: Feb. 16, 2006

(65) Prior Publication Data

US 2007/0290117 A1    Dec. 20, 2007

Related U.S. Application Data

(60) Provisional application No. 60/598,308, filed on Aug. 2, 2004.

(51) Int. Cl.
*F16H 37/06* (2006.01)
*G02B 7/182* (2006.01)
*H02K 7/116* (2006.01)

(52) U.S. Cl. .................. 74/724; 74/661; 74/421 A; 359/877

(58) Field of Classification Search .............. 74/724, 74/661, 421 A; 248/466; 359/841, 871–874, 359/876–877
See application file for complete search history.

(56) References Cited

U.S. PATENT DOCUMENTS

| 4,056,253 A | * | 11/1977 | Repay et al. ............ 248/479 |
| 4,286,841 A | * | 9/1981 | Deshaw ................. 359/876 |
| 6,874,896 B2 | * | 4/2005 | Yoshida ................ 359/841 |

FOREIGN PATENT DOCUMENTS

| JP | 08164796 A | * | 6/1996 |
| JP | 2000085470 A | * | 3/2000 |
| JP | 2000264131 A | * | 9/2000 |

OTHER PUBLICATIONS

Translation of JP08164796A.*

* cited by examiner

*Primary Examiner*—Tisha D Lewis
(74) *Attorney, Agent, or Firm*—Rohm & Monsanto, PLC

(57) ABSTRACT

An arrangement for orienting a device angularly is provided with a back element on which the device to be oriented is installed. A ball and a spherical gear are arranged concentrically. A base portion has a socket that engages with the ball. Also, a motor having a rotatory shaft is installed on the base portion, and a worm drive element is coupled to the rotatory shaft and arranged to engage the spherical gear when the ball and socket are engaged, whereby the spherical gear is urged along the longitudinal axis of the tapered worm drive element and the tapered worm drive element slides along the gear teeth of the spherical gear. The motor enhances the rigidity of the base portion. The worm drive element and the spherical gear disengage in response to the application of a force through the first spherical gear.

12 Claims, 8 Drawing Sheets

ORIENTING ARRANGEMENT FOR MIRROR OR LIGHT SOURCE

RELATIONSHIP TO OTHER APPLICATIONS

This application is a US national stage filing under 35 U.S.C. §371 of International Application No. PCT/US2005/027449 filed on Aug. 2, 2005 and claims the benefit under 35 U.S.C. §119(e) of U.S. Provisional Patent Application Ser. No. 60/598,308 filed Aug. 2, 2004.

BACKGROUND OF THE INVENTION

1. Field of the Invention

This invention relates generally to arrangements for orienting optical devices, and more particularly, to a system for orienting an external rear view mirror for a motor vehicle.

2. Description of the Related Art

Known remotely adjustable outside mirror arrangements for vehicles are complex and are subject to failure, particularly when snow and ice are present. Typically, numerous parts, including relatively fragile gear sections, are required to be incorporated within a mirror housing. There is a need for a remotely adjustable mirror arrangement for a motor vehicle that is simple to fabricate, and yet is reliable and sturdy using but a relatively small number of individual parts.

It is, therefore, an object of this invention to provide a simple and sturdy rear view mirror arrangement for a motor vehicle.

It is another object of this invention to provide an outside mirror arrangement for a vehicle that can resist contamination from the environment.

It is also an object of this invention to provide an outside mirror arrangement for a vehicle that is simple to fabricate and requires a reduced number of parts.

It is a further object of this invention to provide a mirror orientation arrangement that provides two degrees of freedom of adjustment of the mirror using a single drive motor.

It is additionally an object of this invention to provide a remotely adjustable outside mirror arrangement for a vehicle wherein the number of individual parts thereof required to be assembled during manufacture is reduced.

It is yet a further object of this invention to provide a simple and economical remotely adjustable platform arrangement for an optical apparatus.

SUMMARY OF THE INVENTION

The foregoing and other objects are achieved by this invention which provides an arrangement for orienting a device angularly that is provided with a back element on which the device to be oriented is installed. The back element has a first portion of a coupling element and a first spherical gear arranged concentrically in relation to the first portion of the coupling element. A base portion has a second portion of the coupling element for engaging with the first portion of the coupling element. There is additionally provided a motor having a rotatory shaft, the motor being installed on the base portion. A worm drive element is installed on the rotatory shaft and arranged to engage the first spherical gear when the first and second portions of the coupling element are engaged with each other.

In one embodiment, the engagement between the worm drive element and the first spherical gear is arranged to disengage in response to the application of a force through the first spherical gear. In a rear view mirror embodiment of the invention, this feature permits manual orientation of the mirror.

In a practical embodiment of the invention, the first portion of the coupling element is a ball, and the second portion of the coupling element is a correspondingly dimensioned socket. There is further provided a worm gear-worm combination element arranged intermediate of the worm drive element and the first spherical gear.

A protective bellows element is disposed intermediate of the back element and base portion for covering the motor, the worm drive element, and the first and second portions of the coupling element.

In one embodiment of the invention, the back element is provided with a second spherical gear arranged concentrically in relation to the first portion of the coupling element. In this embodiment, the first and second spherical gears are arranged orthogonal to each other. In an advantageous embodiment of the invention, there are further provided:

a second motor having a rotatory shaft, the second motor being installed on the base portion; and a second worm drive element installed on the rotatory shaft and arranged to engage the second spherical gear when the first and second portions of the coupling element are engaged with each other.

Further in accordance with this embodiment, there is provided a switching arrangement having first and second positions for urging the worm drive element associated with the motor to engage the first spherical gear when the switching arrangement is in the first position, and to engage the second spherical gear when the switching arrangement is in the second position. In one embodiment, the switching arrangement includes a shape-memory alloy (SMA) actuator.

In accordance with a further aspect of the invention, first and second brakes are provided for limiting angular displacement of the back element along respective axes of axial displacement. In this manner, the back element is displaced angularly in an axial direction associated with a released one of the first and second brakes.

There is provided in accordance with the present invention an apparatus for controlling the orientation of a mirror used for automotive, marine, aircraft, or other transportation systems. The apparatus could also be used to control a pointing device such as a (video) camera or a laser (or light) source. In a mirror embodiment, the apparatus employs one or two motors to effect rotation about two perpendicular axes that are substantially coplanar with the plane of the mirror. In embodiments where two motors are present, motion about both axes can be controlled simultaneously. The apparatus also restricts all other degrees of freedom, whereby the mirror is rotatable about the two axes only. A particularly advantageous methodology for manufacturing the arrangement of the present invention involves injection molding of polymer materials. However, other embodiments will employ other or alternative materials, such as metals, ceramics, composites, etc., with correspondingly suitable fabrication methods.

The primary embodiment of the apparatus is two sets of gear teeth that are oriented at 90° from each other, coplanar to an (offset) mirror plane. The pitch diameter of each of these gears is formed about a spherical surface that is a constant distance from a center ball joint. The teeth formed on these spherical surfaces are revolved about the primary axes of rotation where a separate axis of rotation is used for each set of gear teeth. A spiral worm meshes with each gear set. When the worm rotates, the gear revolves about its primary axis. When the alternative axis is driven, the primary gear and worm slide relative each other (about the revolved gear teeth) creating no net rotational motion about the primary axis.

Specific to transportation applications, the apparatus contains a flexible bellow-type structure that encases the assembly and prevent the motors and gear arrangements from being contaminated by environmental water and dust. Additionally, the assembly uses flexibility in the gear mounting structure to allow the gears to ratchet over one another if enough torque is present. This torque might represent the user manually repositioning the mirror in the event that one or more of the motors is inoperable. This torque might also represent a fixed object (frozen ice) that would block the mirror from rotating. This override feature would allow the motors to continue to rotate and avoid motor damage.

Several variations exist with this design that allow one motor to be used to drive both rotational axes. These variations employ an alternative actuator, that preferably simpler and of less cost than an additional or second motor, to physically move the motor and its associated worm, from one driving axis to the alternative driving axis.

The first alternative arrangement can be accomplished using a spring or other energy storage device to bias the motor to one axis. When the alternative axis is energized, an electromagnet, shape memory alloy, or alternative actuator, pulls the motor to disengage the motor-worm from one axis and then to engage the motor-worm to the alternative axis.

A second alternative arrangement repositions the spherical gear about a new axis at an angle of 45° relative to the two primary axes of rotation. A single or double arrangement of axis brakes can then be applied to prevent or allow rotation of each axis. By freeing one axis to rotate and braking the other, the 45° worm-gear combination will only provide motion to the free axis and the worm-gear combination will simultaneously mesh and slide relative to each other to provide the correct output motion.

A further embodiment eliminates the worm-gear-worm double reduction gear and uses the motor, with an associated worm, to drive the spherical gear directly for each axis.

Mirror Design Constraints:
Motor-driven tilt and roll (~25° each axis)
Restrain all other degrees of freedom
Resist moisture and dust contaminants
Allow manual override for repositioning of the mirror
Provide adequate stiffness to resist vibration excitation ($\omega_1 >$ 20 to 40 Hz)

BRIEF DESCRIPTION OF THE DRAWING

Comprehension of the invention is facilitated by reading the following detailed description, in conjunction with the annexed drawing, in which:

FIG. 7 is a perspective representation of a bellows that is useful to protect the various embodiments of the invention from weather and the like;

DETAILED DESCRIPTION

Figure 1:
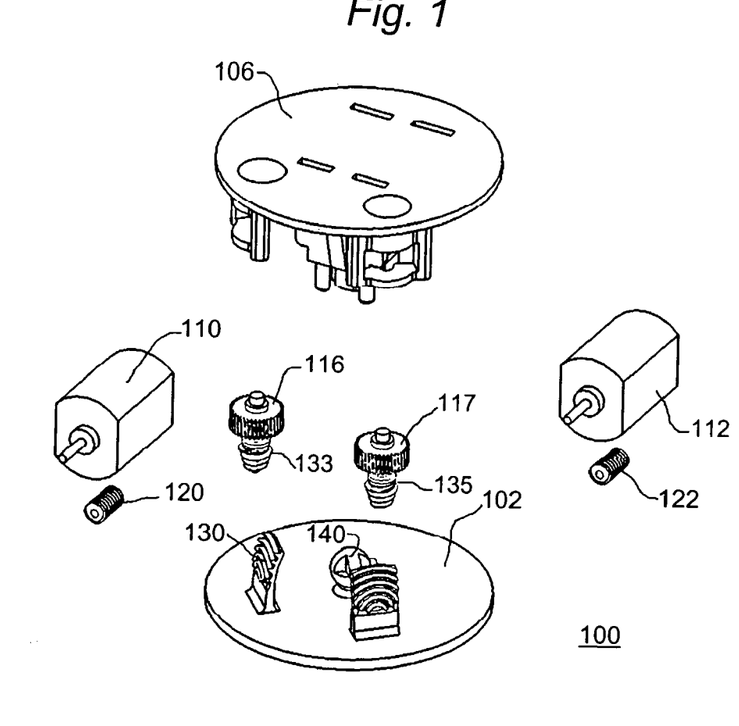
FIG. 1 is a simplified partially exploded perspective representation of a first angularly displaceable mirror embodiment of the invention for a vehicle.

FIG. 1 is a simplified partially exploded perspective representation of an angularly displaceable mirror support arrangement 100 for a vehicle (not shown). As shown in this figure, there is provided a base 102 that underlies a top plate 106. Two motors, 110 and 112, are arranged between the base 102 and top plate 106. There are additionally provided respectively associated ones of gear arrangements 116 and 117. Each of motors 110 and 112 has an associated one of worm gears 120 and 122 that, when assembled, will be coaxially coupled with the shafts (not specifically designated) of the motors. Base 102 has integrally formed therewith in this specific illustrative embodiment of the invention a pair of partial gears 130 and 131 that engage with worm portion 133 and 135, respectively, of gear arrangements 116 and 117. In this specific illustrative embodiment of the invention, are spherical gears. As gear arrangements 116 and 117 are rotated by motors 110 and 112, base 102 is angularly displaced about ball 140. Thus, each of the motors 110 and 112 causes angular displacement along a respective axis (x,y). Thus, gear arrangements 116 and 117 are arranged orthogonal to one another in this specific illustrative embodiment of the invention.

It is to be understood that the present invention is not limited to the orientation of vehicle mirrors, but instead may additionally be applied to the orientation of any other object, including, for example, laser and other light sources, that would benefit from powered angular displacement in one or more degrees of freedom. As shown in FIG. 1, and as will be described in greater detail below, the present embodiment is a two-motor arrangement wherein each motor causes displacement along a respectively associated degree of freedom.

Figure 2:
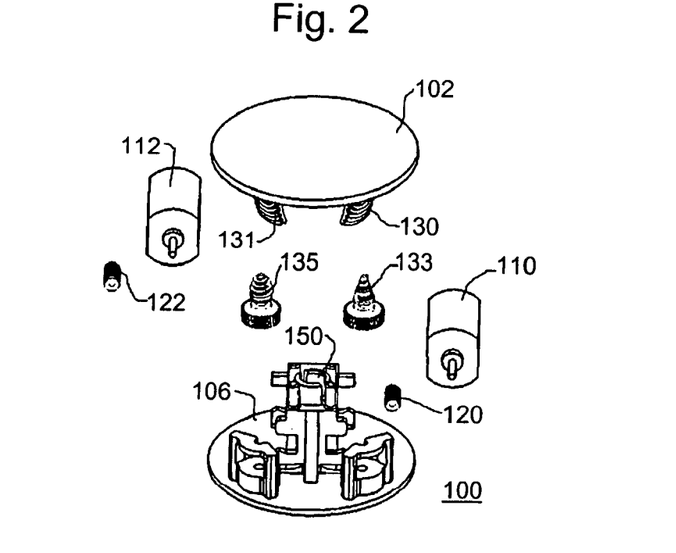
FIG. 2 is a simplified partially exploded perspective representation of the two-motor angularly displaceable mirror embodiment of FIG. 1 inverted to show the underside of the top plate.

FIG. 2 is a simplified partially exploded perspective representation of the two-motor angularly displaceable mirror support arrangement of FIG. 1, shown inverted to illustrate the underside of top plate 106. Elements of structure that have previously been discussed are similarly designated. Ball 140 (FIG. 1) is engaged within a socket 150, and is permitted to rotate over a predetermined angle of displacement therewithin.

Figure 3:
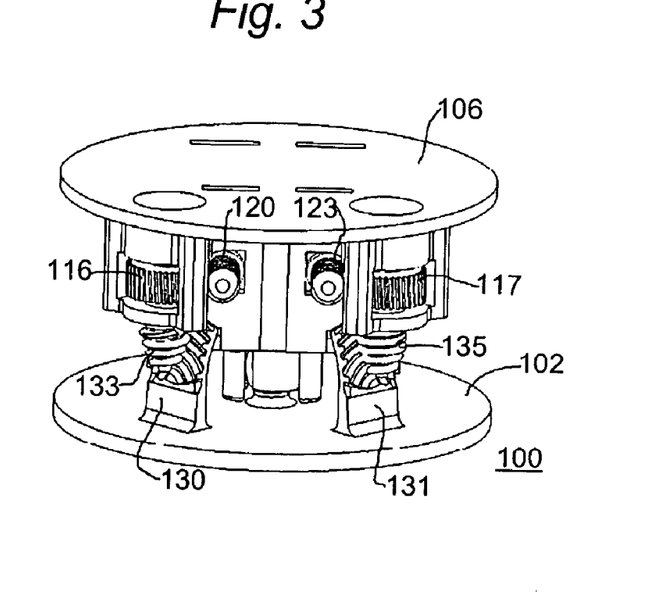
FIG. 3 is a simplified perspective representation of the angularly displaceable two-motor mirror embodiment of the invention of FIG. 1 in assembled condition.

FIG. 3 is a simplified perspective representation of the angularly displaceable two-motor mirror embodiment of the invention of FIG. 1 in assembled condition. Elements of structure that have previously been discussed are similarly designated.

Figure 4:
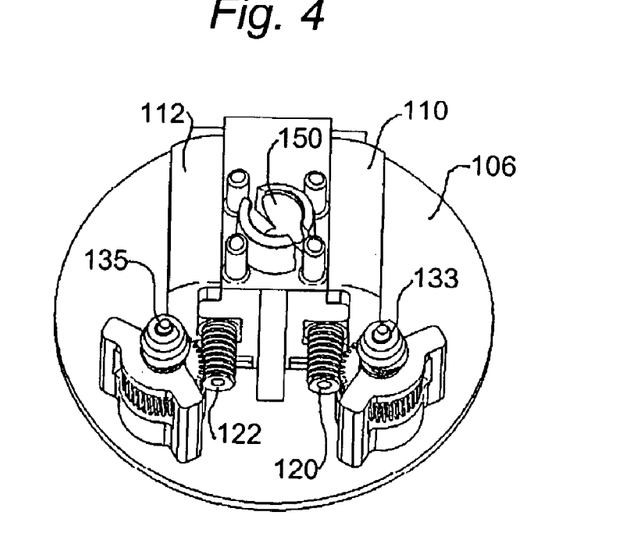
FIG. 4 is a simplified partially open perspective representation of the two-motor embodiment of FIG. 3 showing the relationship between the various parts from beneath.

FIG. 4 is a simplified partially open perspective representation of the two-motor embodiment of FIG. 1 showing the relationship between the various parts from beneath. As shown in this figure, worm gears 120 and 122 are engaged with respectively associated ones of gear arrangements 116 and 117, and are rotated thereby.

Figure 5:
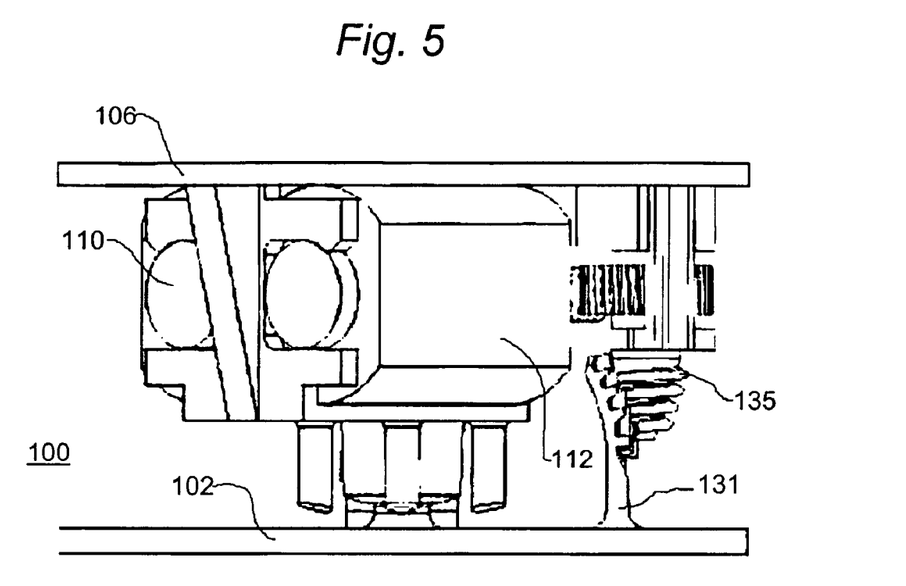
FIG. 5 is a perspective representation of an the embodiment of the invention wherein two motors are coupled to a base plate and further serve to strengthen the rigidity of the base plate.

FIG. 5 is a perspective representation of the embodiment of the invention wherein the two motors 110 and 112 are coupled to top plate 106 and further serve to strengthen the rigidity of the top plate. Of course, in other embodiments of the invention, angularly displaceable mirror support arrangement 100 can be operated in an inverted manner wherein the top plate serves as the base.

Figure 6:
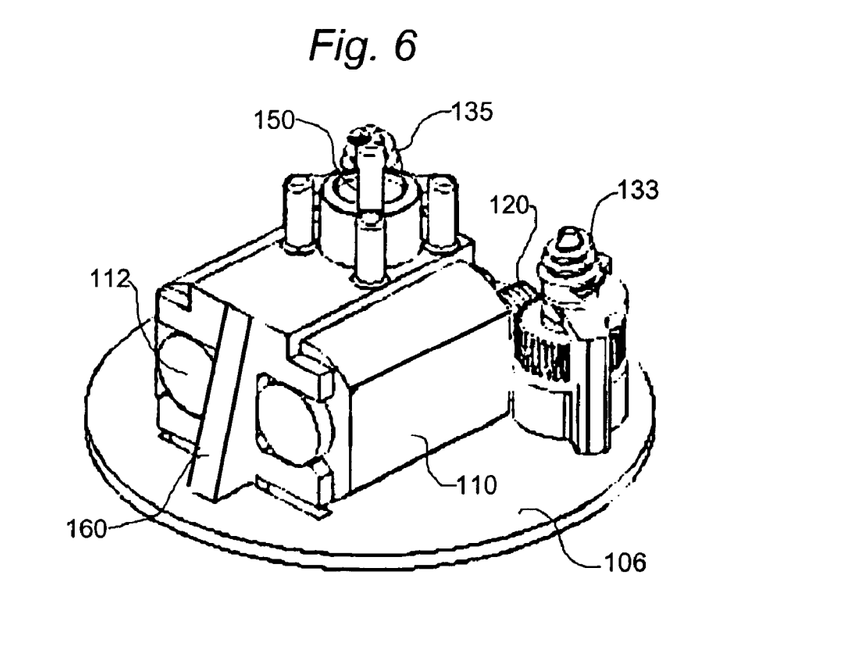
FIG. 6 is a simplified perspective representation of the embodiment of FIG. 5 in partially disassembled condition to reveal the interrelationship of the various components from the underside.

FIG. 6 is a simplified perspective representation of the embodiment of FIG. 5 in partially disassembled condition to reveal the interrelationship of the various components from the underside. Elements of structure that have previously been discussed are similarly designated. This figure illustrates the reverse side of coupling structure 160 that supports the motors onto top plate 106.

Figure 7:
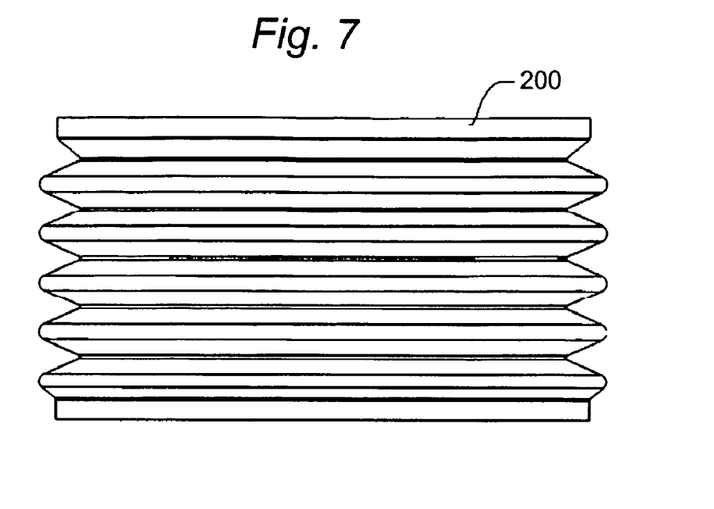

FIG. 7 is a perspective representation of a bellows 200 that is useful to protect the various embodiments of the invention from weather and the like.

Figure 8:
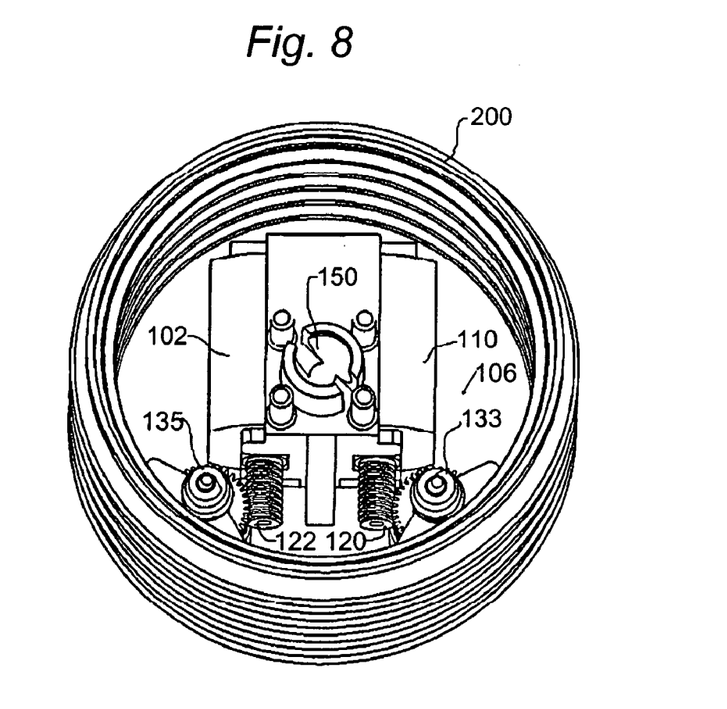
FIG. 8 is a simplified perspective representation showing the details of the two-motor embodiment of FIG. 5 enclosed within the bellows of FIG. 7.

FIG. 8 is a simplified perspective representation showing the details of the two-motor embodiment of FIGS. 5 and 6 enclosed within bellows 200 of FIG. 7. Elements of structure that have previously been discussed are similarly designated.

Figure 9:
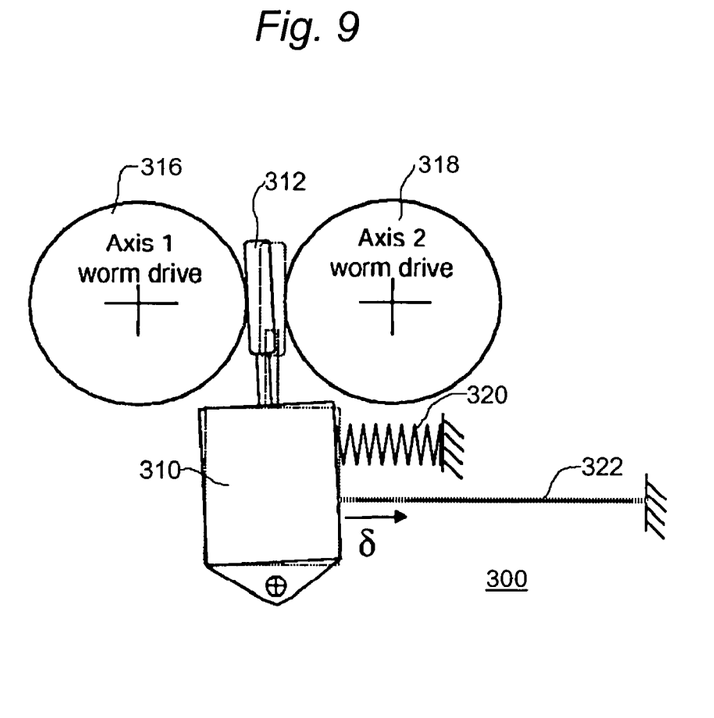
FIG. 9 is a simplified schematic representation showing a one-motor embodiment of the invention.

FIG. 9 is a simplified schematic representation showing a one-motor embodiment 300 constructed in accordance with the principles of the invention. As shown in this figure, a motor 310 is angularly displaceable to engage selectively with a first worm drive 316 and a second worm drive 318. The angular displacement of motor 310 is governed by the combination of a spring 320 and a shape-memory alloy ("SMA") actuator wire (hereinafter "SMA 322"). The single motor 310 is coupled to one end of SMA 322, and the other end of SMA 322 is, in this specific illustrative embodiment of the invention, coupled to a stanchion (not shown in this figure) on the base (not shown in this figure). It is to be understood that any other suitable form of actuator, such as an electromagnet, can be employed in the practice of the invention, instead of SMA 322.

Figure 10:
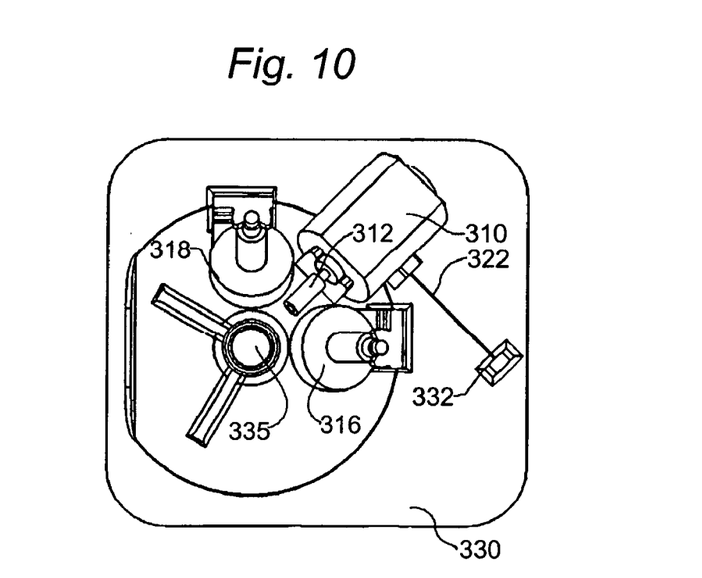
FIG. 10 is a simplified perspective representation showing the one-motor embodiment of FIG. 9.

FIG. 10 is a simplified perspective representation showing the one-motor embodiment of FIG. 9. Elements of structure that have previously been discussed are similarly designated. SMA 322 is shown in this figure to be coupled to stanchion 332 on base 330. There is additionally shown a socket 335 for accommodating a ball 337 (FIG. 11).

Figure 11:
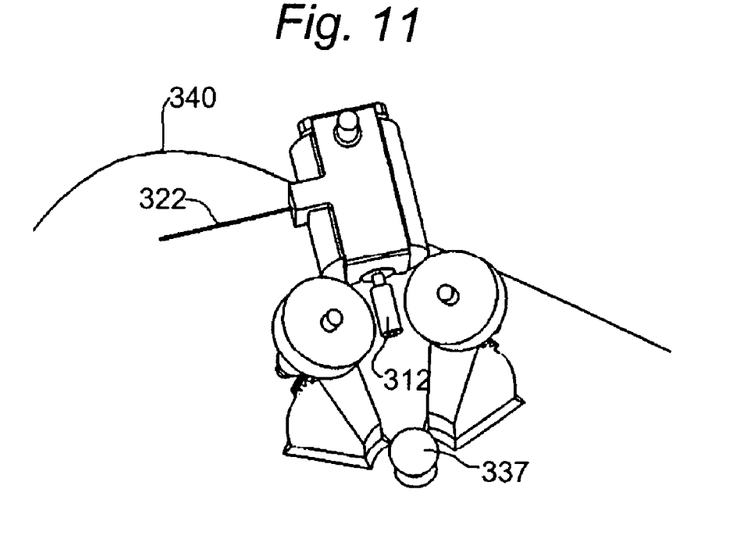
FIG. 11 is a simplified schematic representation showing the one-motor embodiment of the invention.

FIG. 11 is a simplified schematic representation showing the one-motor embodiment of the invention in inverted condition to illustrate the underside of a top plate 340.

Figure 12:
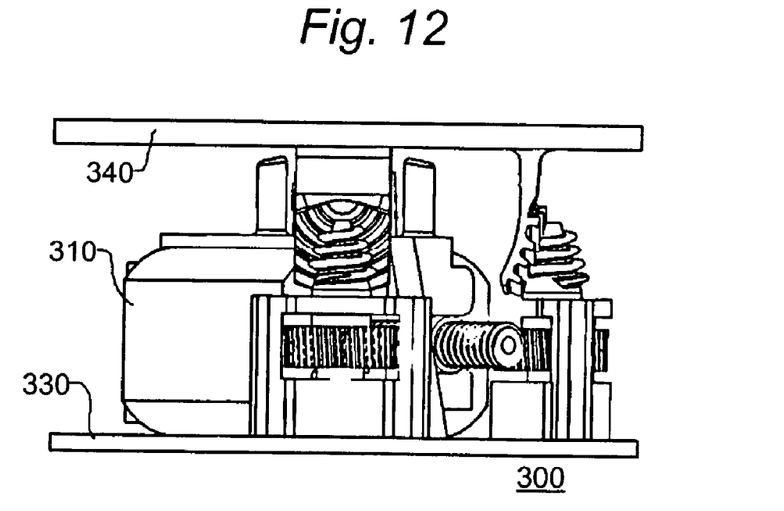
FIG. 12 is a simplified isometric schematic representation of a one-motor embodiment of the invention showing details of the gears.

FIG. 12 is a simplified isometric schematic representation of one-motor embodiment 300 of the invention showing details of the gears, as previously described.

Figure 13:
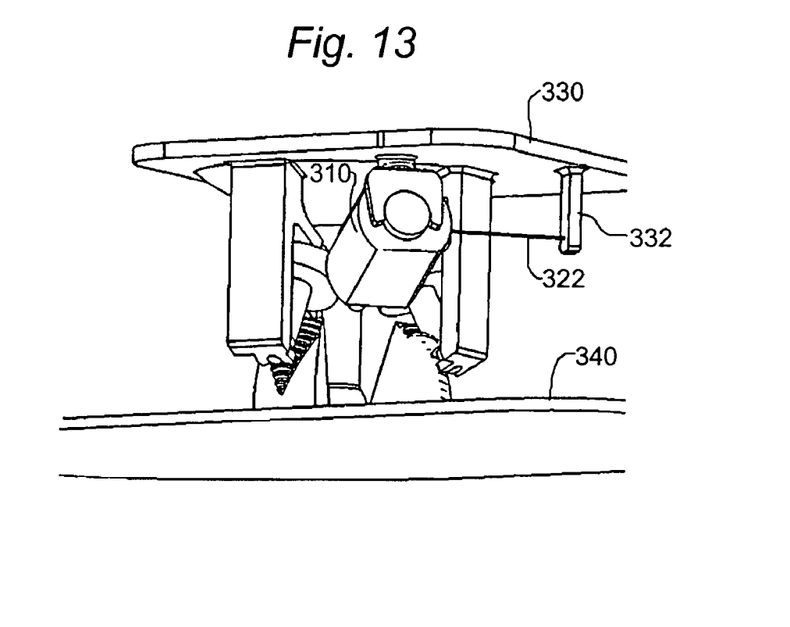
FIG. 13 is a simplified isometric schematic representation of the one-motor embodiment of FIG. 11.

FIG. 13 is a simplified isometric schematic representation of the one-motor embodiment of FIG. 11, showing the underside of base 330 in substantially assembled condition.

Figure 14:
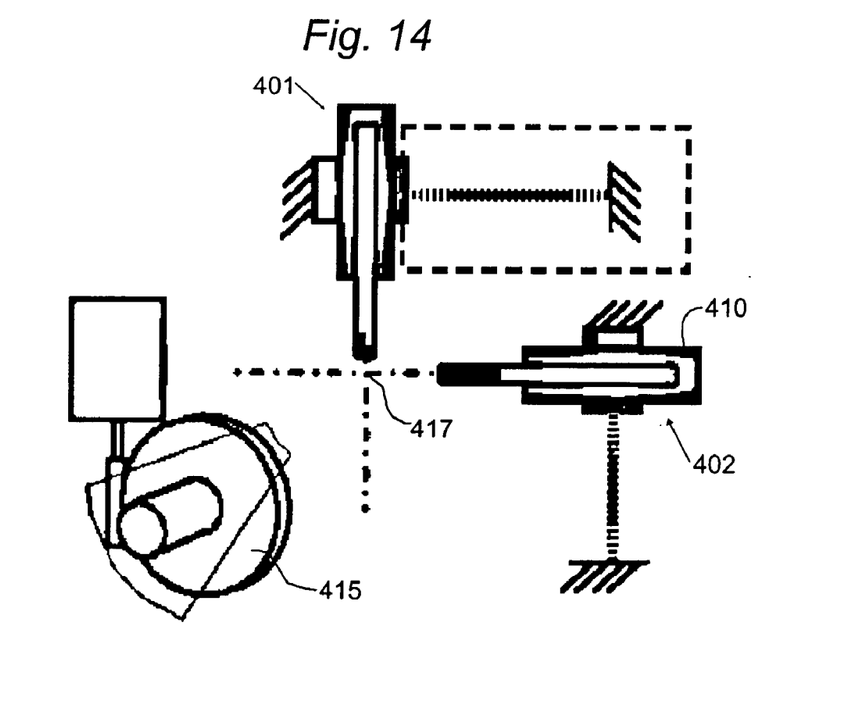
FIG. 14 is a schematic diagram showing the interrelationship between various braking components.

FIG. 14 is a schematic diagram showing the interrelationship between various braking components that are useful in the practice of the invention. As shown in this figure, x and y braking arrangements 401 and 402 are configured to control motion along respectively associated ones of the x and y axes (not shown). Each such braking arrangement, in this specific illustrative embodiment of the invention, includes a caliper, such as caliper 410 that is fixed to a base (not shown) or cover plate (not shown). In this embodiment, the single motor operates in conjunction with the braking arrangements, which operate to preclude mirror displacement along respective ones of the degrees of freedom. The motor will urge the mirror into displacement along whichever degree of freedom has the associated brake released.

A (spherical) partial 415 gear is arranged at a predetermined radius from the center 417 of the ball (not shown in this figure) of the ball joint (not shown in this figure). Additionally, a pair of orthogonally arranged brake posts (not shown) support the brakes of the respective axes. In this embodiment, the spherical gear is disposed at 45° with respect to each of the axes of angular displacement of the mirror.

Figure 15:
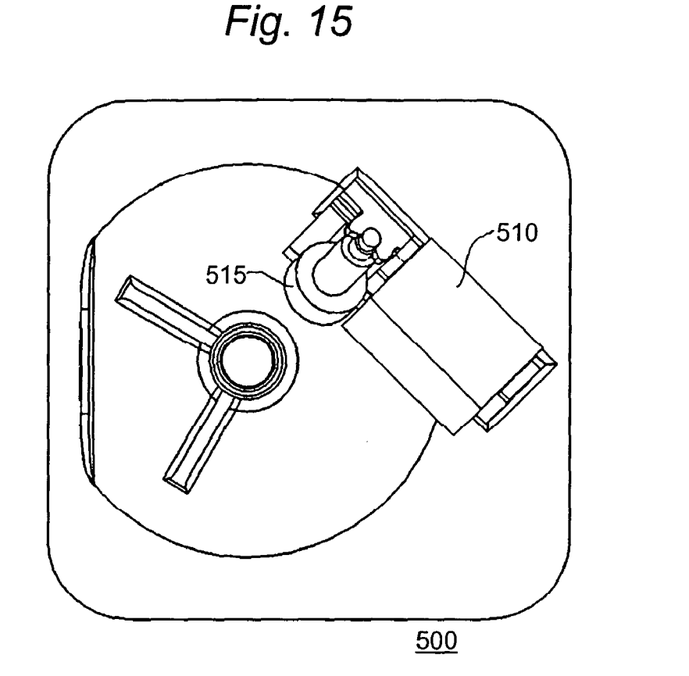
FIG. 15 is a simplified plan view of a further embodiment of the invention.

FIG. 15 is a simplified plan view of a further single motor embodiment 500 of the invention. As shown in this figure, a motor 510 is closely coupled to a drive arrangement 515 that may, in certain embodiments, constitute a worm drive. In other embodiments, however, drive arrangement 515 may constitute a resilient, friction coupled element.

Figure 16:
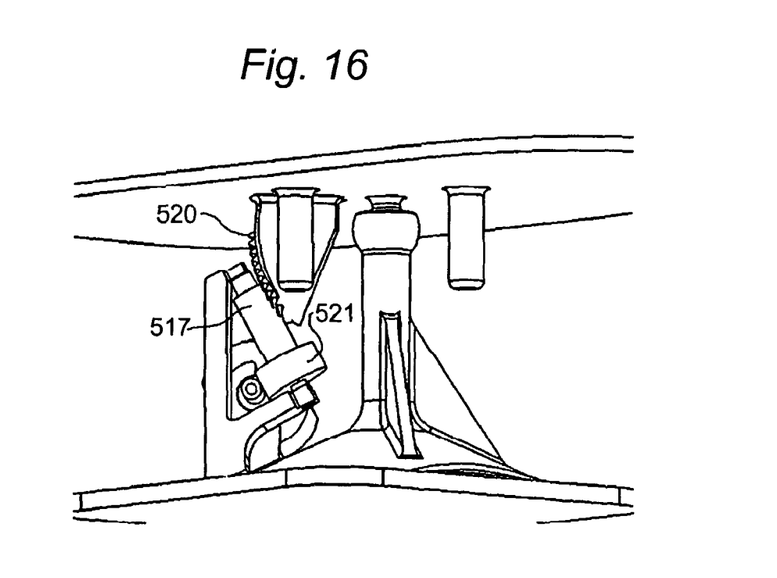
FIG. 16 is a simplified isometric representation of the embodiment of FIG. 15 showing a greater degree of assembly.

FIG. 16 is a simplified isometric representation of the embodiment of FIG. 15 showing a greater degree of assembly in this embodiment, drive arrangement 515 may engage as a worm drive with partial gear 520, or may, in certain embodiment, couple as a resilient frictional element 521.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. An arrangement for orienting a device angularly, the arrangement comprising:
   a back element on which the device to be oriented is installed;
   a first portion of a coupling element installed on said back element;
   a first spherical gear arranged concentrically in relation to said first portion of the coupling element, said first spherical gear formed as a partial spherical surface and having gear teeth revolved on the partial spherical surface;
   a base portion;
   a second portion of the coupling element for engaging with the first portion of the coupling element;
   a motor having a rotatory shaft, said motor being installed on said base portion; and
   a worm drive element coupled to the rotatory shaft of said motor, said worm drive element having a longitudinal axis of rotation and being engageable with the gear teeth revolved on the partial spherical surface when the first and second portions of the coupling element are engaged with each other, so as to urge said first spherical gear along the longitudinal axis of said worm drive element and to allow said worm drive element to slide along the gear teeth of said first spherical gear.

2. The arrangement of claim 1, wherein the engagement between said worm drive element and the first spherical gear is arranged to disengage in response to the application of a force through the first spherical gear.

3. The arrangement of claim 1, wherein the first portion of the coupling element is a ball, and the second portion of the coupling element is a socket.

4. The arrangement of claim 1, wherein there is further provided a worm gear-worm combination element arranged intermediate of said worm drive element and the rotary shaft of said motor.

5. The arrangement of claim 1, wherein there is further provided a bellows element intermediate of said back element and said base portion for covering said motor, said worm drive element, and said first and second portions of the coupling element.

6. An arrangement for orienting a device angularly, the arrangement comprising:
   a back element on which the device to be oriented is installed;
   a first portion of a coupling element coupled to said back element;
   a first spherical gear arranged concentrically in relation to the first portion of said coupling element;
   a second spherical gear arranged concentrically in relation to said first portion of the coupling element;
   a base portion;
   a second portion of the coupling element coupled to said base portion for engaging with said first portion of the coupling element;
   a motor having a rotary shaft, said motor being installed on said base portion; and
   a first worm drive element coupled to the rotatory shaft of said motor and arranged to engage the first spherical gear when said first and second portions of the coupling element are engaged with each other.

7. The arrangement of claim 6, wherein said first and second spherical gears are arranged substantially orthogonal to each other.

8. The arrangement of claim 6, wherein there are further provided:
   a second motor having a second rotatory shaft, said second motor being installed on said base portion; and
   a second worm drive element coupled to the second rotatory shaft and arranged to engage the second spherical gear when the first and second portions of the coupling element are engaged with each other.

9. The arrangement of claim 7, wherein there is further provided a switching arrangement having first and second positions for urging said motor to engage said first worm drive element when said switching arrangement is in the first position, and to engage a second worm drive element when said switching arrangement is in the second position.

10. The arrangement of claim 9, wherein said switching arrangement comprises a shape-memory alloy (SMA) actuator.

11. The arrangement of claim 6, wherein there are further provided first and second brakes for limiting angular displacement of said back element along respective axes of axial displacement, whereby said back element is displaced angularly in an axial direction associated with a released one of said first and second brakes.

12. The arrangement of claim 6, wherein said motor is installed on said base portion to enhance the rigidity of said base portion.

* * * * *